United States Patent Office.

HEINRICH VOLLBRECHT AND CARL MENSCHING, OF BUFFALO, NEW YORK, ASSIGNORS TO THE SCHOELLKOPF ANILINE AND CHEMICAL COMPANY, OF SAME PLACE.

RED COLORING-MATTER FROM ALPHA DIAZO BETA-NAPHTHYLAMINE SULPHONIC ACID.

SPECIFICATION forming part of Letters Patent No. 356,672, dated January 25, 1887.

Application filed January 27, 1886. Serial No. 189,929. (Specimens.)

*To all whom it may concern:*

Be it known that we, HEINRICH VOLLBRECHT and CARL MENSCHING, both of the city of Buffalo, in the county of Erie and State of New York, have invented new and useful Improvements in Dye-Stuffs, of which the following is a specification.

Our invention relates to a new dye-stuff, which results from the reaction of beta-naphthol with alpha diazonaphthaline monosulphonic acid.

In producing this acid we proceed as follows: We mix one hundred parts, by weight, of the lime salt of alpha naphthaline monosulphonic acid, which acid is made in the usual manner, with two hundred parts of sulphuric acid of 66° Baumé. We then add to this mixture slowly forty-five parts of nitric acid of 40° Baumé at a temperature of from 90° to 100° centigrade, whereby two nitro monosulphonic acids are formed. These acids are converted into their amido compounds by any suitable and well-known method, which conversion results in two naphthylamine sulphonic acids. These last two acids are easily separated, owing to the unequal solubility of their salts in water. The naphthylamine sulphonic acid, which forms a sodium salt which is easily soluble in water, is used for producing our new dye-stuff, which we call "Brilliant Red." This last-mentioned acid has never been used to prepare dye-stuffs directly.

We prepare our new dye-stuff as follows: We mix two hundred and twenty-three pounds of the above-described naphthylamine sulphonic acid with about two thousand pounds of water and three hundred and eighty pounds of hydrochloric acid of 20° Baumé. We cool the mixture so prepared to from 4° to 6° centigrade, and pour into it slowly eighty pounds of sodium nitrite dissolved in two hundred pounds of water. The mixture is now left at rest for several hours—that is to say, until the naphthylamine sulphonic acid is converted into diazonaphthaline sulphonic acid. We next slowly pour this diazo compound into a solution of one hundred and forty-four pounds of beta-naphthol dissolved in three hundred pounds of caustic soda of fifteen per cent. strength.

The dye-stuff is formed as shown by the following formula.

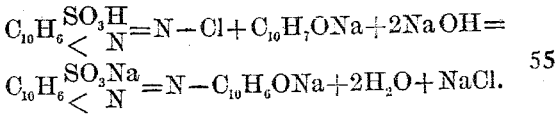

The new dye-stuff is purified by crystallization in a well-known manner.

Our new dye-stuff is a brilliant red, which is lighter and of a more yellowish shade than the well-known "Rocelline" or "fast red." The last-named dye-stuff is produced from the naphthylamine sulphonic acid known as "Piriás," which differs materially from the naphthylamine sulphonic acid which we use in producing our dye-stuff. When both naphthylamine sulphonic acids (ours and Piriás) are converted into naphthol sulphonic acids, two different acids are obtained. Rocelline, when treated with sulphuric acid of 66° Baumé, dissolves to a solution of a blue color, while the same solution of our new dye-stuff produces a red violet.

We claim as our invention.

As a new product, the dye-stuff or coloring-matter which results from the reaction of the diazo compound of the above-described naphthylamine sulphonic acid with beta-naphthol, substantially as set forth.

Witness our hands this 23d day of January, 1886.

H. VOLLBRECHT.
C. MENSCHING.

Witnesses:
EDWARD WILHELM,
OSCAR SCHAUB.